Dec. 6, 1927.

W. P. HAMMOND

TIRE COVER

Filed May 19, 1921

INVENTOR
WILLIAM P. HAMMOND

ATTORNEYS

Dec. 6, 1927.

W. P. HAMMOND

TIRE COVER

Filed May 19, 1921

INVENTOR
WILLIAM P. HAMMOND
BY
ATTORNEY

Patented Dec. 6, 1927.

1,651,769

UNITED STATES PATENT OFFICE.

WILLIAM P. HAMMOND, OF SCARSDALE, NEW YORK.

TIRE COVER.

Application filed May 19, 1921. Serial No. 470,834.

My invention relates more particularly to tire covers or casings forming a housing for extra or spare tires, and has been designed primarily for use in connection with such tires when mounted upon removable or demountable rims.

Among the objects of my invention are to provide a metallic tire case or housing which will enclose the entire rubber surface of a spare tire mounted upon a demountable rim, so as to protect the tire from heat of the exhaust gases emanating from the engine, should the tire be mounted upon a bracket at the rear of the automobile, and from the heat of the rays of the sun, as well as from grease, oil, water and other influences which might have a deteriorating action upon the rubber.

Another object of my invention is to provide a sectional casing of sheet metal of the described character, which will be wholly suspended upon the tire and taken in connection with the demountable rim upon which the tire is mounted, a complete metallic housing for the spare tire is thus provided.

A still further object of my invention is to provide a sheet metal tire casing for spare tires which will in no wise interfere with the mounting of the spare tire upon any of the well-known forms of tire bracket holders which are now commonly used.

A still further object of my invention is to provide a metallic tire cover which will be attractive in appearance, which may be enameled in the same color as the automobile. and of the same general finish, and as a consequence thereof, may be washed and polished with the car without injury to the casing.

Other objects of the invention will manifest themselves upon reading the following specification.

Referring in detail to the drawings.

Figure 8:
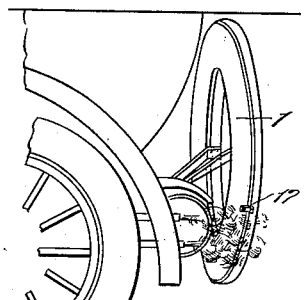
Figure 4:
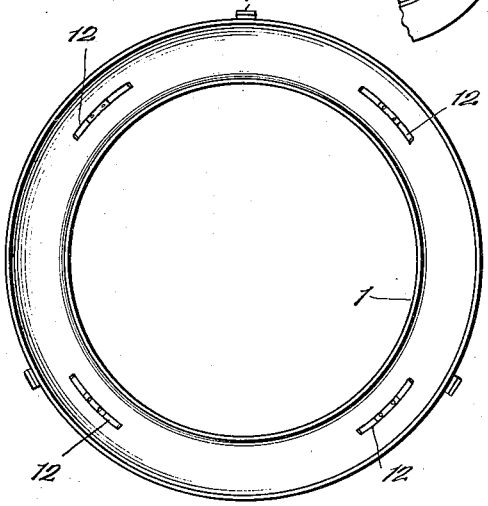
Figure 4 is a plan view of a modified form of structure embodying the principles of my invention, and illustrative of one of a pair of complemental annular channelled casing members which are adapted to enclose the exposed rubber surface of a tire mounted upon a demountable rim.
Figure 5:
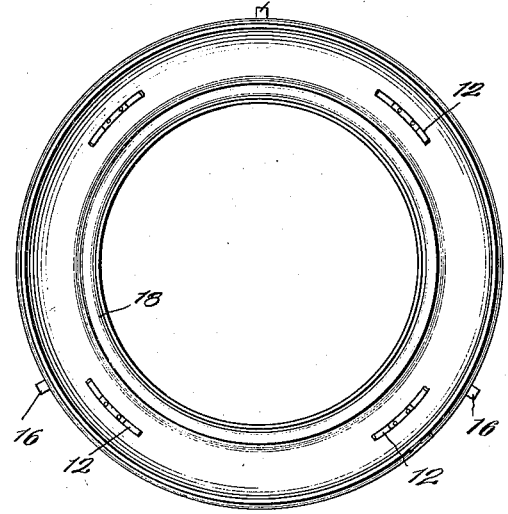
Figures 5 and 6 are reverse plan views of a modified form of structure, which has been provided with a skirt or flange which is designed to afford additional protection.
Figure 6:
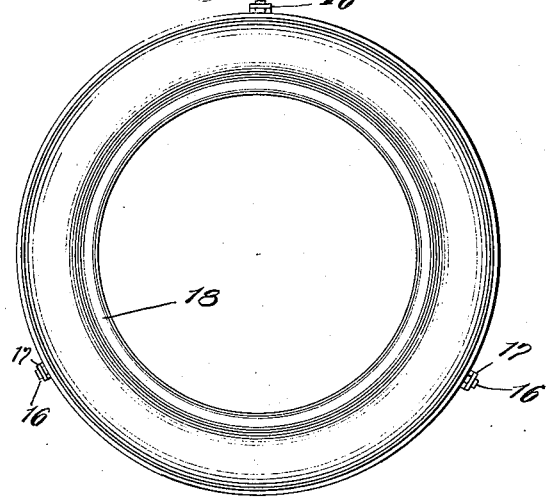
Figure 7:
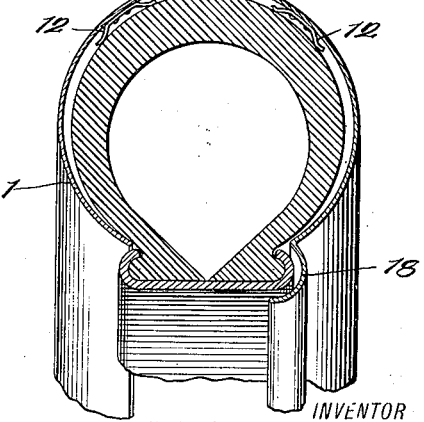

Figure 7 is an enlarged fragmentary detail in cross section, showing the application of this modified form, last referred to, to a demountable rim spare tire; and Figure 8 is a diagrammatic view, largely perspective of a tire case formed of complemental parts similar to the illustration of Figure 4, enclosing a spare tire mounted upon brackets at the rear of an automobile and illustrates the manner in which exhaust gases are commonly directed against tires so mounted.

Figure 1:
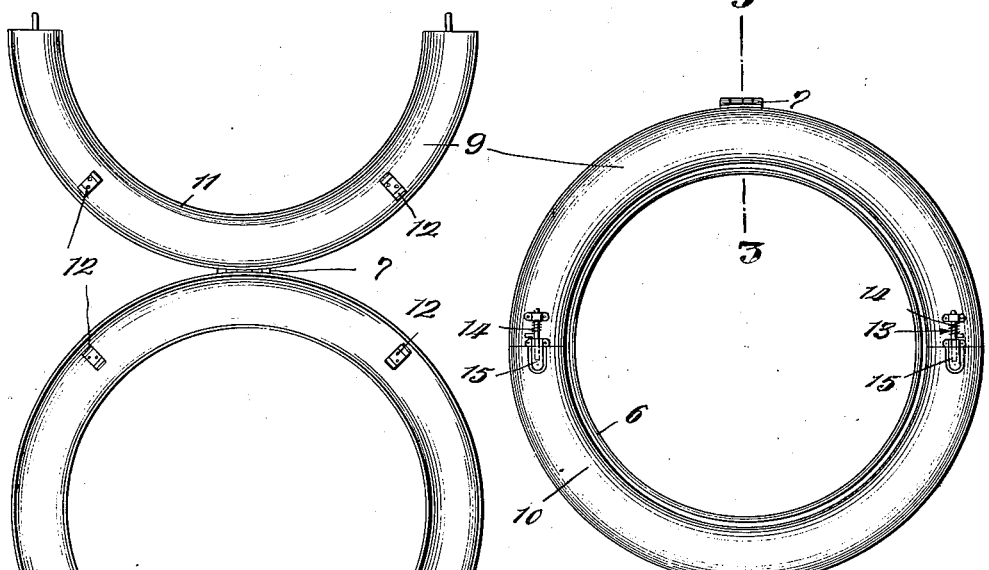
Figure 1 is a plan view of a metallic tire case embodying the principles of my invention, the same shown mounted upon a demountable rim provided with a pneumatic tire.
Figure 2:
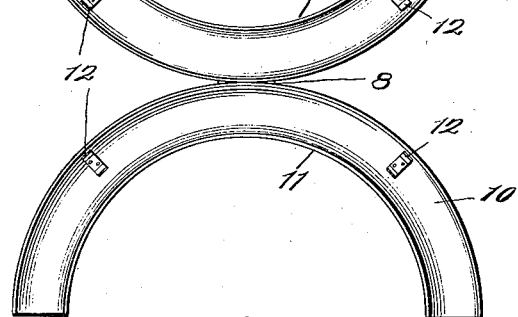
Figure 2 is a plan view of the tire case shown in Figure 1, the tire having been removed and the tire case in opened position.
Figure 3:
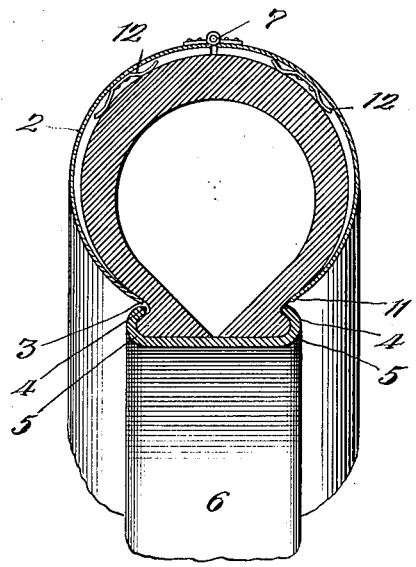
Figure 3 is an enlarged fragmentary detail in cross section, taken on line 3—3 of Figure 1.

Referring to the form of structure illustrated in Figures 1 to 3, inclusive, numeral 1 indicates an annular trough-like sheet metal member provided with a curvature which corresponds to the curvature of the wall of the tire. This member is so shaped that its inner peripheral edge 3 will fit snugly against the side wall of the tire terminating in close proximity to the edge 4 of a curved gripping flange 5 of the automobile rim 6, which flange engages the bead of the tire.

Hinged at the points 7 and 8 to the main sheet metal housing member 1, are a pair of complemental trough-like housing members 9 and 10, which taken together form a member complemental to the member 1, and, when in closed position with the tire housed within the assembly, afford complete protection to the tire with the demountable rim forming, as it were, a complete metallic protecting means for the parts of the tire. The complemental members 9 and 10 are likewise shaped with their inner annular edges 11 closely engaging the side wall of the tire adjacent the gripping flange 5 of the demountable rim.

In order to effect a mounting on a spare tire which may perchance be somewhat smaller in size or diameter than is intended to be accommodated within a casing of a definite given size, I may provide spring members 12 attached at suitable points around the periphery of the casing which are adapted to engage the curved surface of the tire and thus form a snug fit between the sheet metal tire housing and the tire, in a manner thought to be obvious. In order to hold the parts of the casing 1, 9 and 10 in assembled relation upon the tire, suitable locking means 13 may be provided for the purpose, such as a spring-pressed plunger 14 mounted and carried by the section 9, and a receiving sleeve 15 for receiving the plunger 14 carried by the section 10.

Instead of the three-part casing heretofore described, I may to advantage form the casing in two complemental parts, similar to the illustration in Figure 4. When so formed, a locking mechanism such as shown in Figure 7, may be employed to hold the complemental parts together, such locking mechanism consisting of a series of suitable lugs 16 carried by one member, and a series of hingedly mounted cooperating apertured plates 17 carried by the other member.

One of the important features of my invention disregarding the skirt 18 (which may or may not be used, as desirable when conditions may warrant), is the absence of any obstruction extending between or inwardly of the tire rim, thus leaving the tire rim free for engagement with tire-carrying rims, wedging members and the like, which may be provided on tire brackets or carriers which form fixtures upon automobiles for the accommodation of spare tires. Furthermore, it will be obvious that I have provided a metallic tire case which is removable with the spare tire and which may be handled as a unit therewith, and forming no fixed part of an automobile, it enables the handling thereof in the automobile accessory trade.

By supporting the tire casing only on the tire itself, as in the preferred form of my invention, it will be seen that the casing does not contact with the rim or any metallic parts of the tire carrier or automobile, any danger of rattling is thus eliminated.

While I have illustrated and described certain preferable embodiments of the principles of my invention, I have done so by way of example only, not wishing to limit myself to the structural details shown and described, but, on the contrary, reserving unto myself other structural forms which may embody the described principles.

Having thus described my invention what I claim as new herein and desire to secure by Letters Patent is:

1. A metallic protection casing for spare tires of the demountable type comprising a pair of like curved parts conforming to the curvature of the side walls of the tire and having inner peripheral edges terminating adjacent the beads thereof and contacting with the tire whereby said casing is supported solely upon the tire and spaced from the tread thereof, the outer peripheral edges of the parts engaging each other and means for detachably fastening the parts together upon the tire.

2. A metallic protecting casing for a spare tire, comprising a sheet metal housing divided vertically into complemental parts, the outer peripheral edges of said parts overlapping and adapted to be fastened together, while the inner peripheral edges of said parts are adapted to closely fit and engage the side walls of the tire adjacent the demountable rim carrying such tire whereby the casing is supported solely by the tire and spaced from the tread thereof.

3. A metal protecting housing for demountable spare tires, comprising a single piece annular sheet metal member extending around one side of the tire, and a complemental cooperating single piece sheet metal member extending around the opposite side of the tire into engagement with the other sheet metal member, both members having substantially the curvature of the tire, and extending for over 180° around the tire, the edges of said members being nearer together than the widest outside cross-sectional diameter of the tire, whereby said casing is solely supported upon said tire and spaced from the tread thereof, and means for locking the two members together in position upon the tire.

4. In combination with a supporting holder adapted to engage and sustain a spare tire of the demountable type, a spare tire, a protecting casing for the tire comprising two annular separable sheet metal parts of integral construction having substantially the curvature of the tire from bead to bead thereof, and gripping the walls of the tire adjacent the bead to support and suspend the casing wholly upon the tire spaced from the tread thereof.

5. In combination with a tire bracket of an automobile, a rim supported tire of the demountable type supported thereby, a sheet metal housing adapted to cover the tire and be wholly supported thereby, said housing being made up of separable parts, each part conforming to the curvature of the side wall of the tire, said parts snugly contacting with the tire at the bead portion and separated from the tire at the tread portion to provide an air space.

6. In combination with a tire bracket of an automobile, a rim supported tire of the demountable type supported thereby, a sheet metal housing adapted to cover the tire and be wholly supported thereby spaced from the tread of the tire, said housing being made up of two single piece annular complemental parts having substantially the same curvature as the tire and extending more than 180° around the tire and means for releasingly holding the parts in assembled position upon the tire.

7. A protecting casing for spare tires of the demountable type, comprising a plural part sheet metal housing adapted to be supported and suspended wholly upon the tire and having its inner peripheral edge portions curved inwardly toward each other and contacting with the tire adjacent the bead portion, so as to approximately enclose all exposed portions of the tire and space the casing away from the tread thereof.

8. A protecting casing for spare tires of the demountable type, comprising a sheet metal housing divided vertically into complemental parts, the inner peripheral edges of said parts being adapted to snugly fit and engage the side walls of the tire adjacent the bead portion thereof, and the remaining portions of said parts conforming generally to the contour of the tire but slightly spaced therefrom whereby to provide an air passage, the outer peripheral edges of said parts being arranged in overlapping relation, and fastening means projecting transversely across said overlapping portions whereby to secure the parts together.

9. A protecting casing for spare tires of the demountable type comprising a sheet metal housing divided vertically into complemental parts, the inner peripheral edges of said parts being adapted to snugly fit and engage the side walls of the tire adjacent the bead portion thereof, and the remaining portions of said parts conforming generally to the contour of the tire but slightly spaced therefrom whereby to provide an air passage, the outer peripheral edges of said parts being arranged in overlapping relation, yieldable means interposed between the tire and the casing at points spaced outwardly from the inner peripheral edges of the casing, and fastening means projecting transversely across said overlapping portions whereby to secure the parts together.

10. A casing for a demountable rim tire comprising a plurality of separable annular sections, the inner edges of said sections being spaced apart to fit on either side of the demountable rim, said rim forming a closure for the inner wall of said casing, and nonadjustable means to support said casing solely upon said tire and spaced from the tread thereof.

In testimony whereof I have affixed my signature to this specification.

WILLIAM P. HAMMOND.